US012693640B2

(12) United States Patent
Rong et al.

(10) Patent No.: US 12,693,640 B2
(45) Date of Patent: Jul. 28, 2026

(54) SERVO CONTROL METHOD AND SYSTEM FOR MULTI-JOINT HYDRAULIC MANIPULATOR BASED ON ADAPTIVE SLIDING MODE

(71) Applicant: Shandong University, Jinan (CN)

(72) Inventors: Xuewen Rong, Jinan (CN); Shuai Zan, Jinan (CN); Guoteng Zhang, Jinan (CN); Teng Chen, Jinan (CN); Xin Ma, Jinan (CN); Yibin Li, Jinan (CN); Yong Fan, Jinan (CN)

(73) Assignee: Shandong University, Jinan City (CN)

( * ) Notice: Subject to any disclaimer, the term of this patent is extended or adjusted under 35 U.S.C. 154(b) by 327 days.

(21) Appl. No.: 18/607,183

(22) Filed: Mar. 15, 2024

(65) Prior Publication Data

US 2024/0272593 A1     Aug. 15, 2024

(30) Foreign Application Priority Data

Sep. 11, 2023     (CN) .......................... 202311166832.6

(51) Int. Cl.
| | |
|---|---|
| *G05B 13/04* | (2006.01) |
| *B25J 3/04* | (2006.01) |
| *B25J 9/16* | (2006.01) |

(52) U.S. Cl.
CPC .............. *G05B 13/042* (2013.01); *B25J 3/04* (2013.01); *B25J 9/1664* (2013.01)

(58) Field of Classification Search
CPC ......... G05B 13/042; B25J 3/04; B25J 9/1664; B25J 9/1633; B25J 9/1679; B25J 17/0258; B25J 18/00

USPC .......................... 318/568.11, 568.1, 567, 560
See application file for complete search history.

(56) References Cited

U.S. PATENT DOCUMENTS

| | | | | |
|---|---|---|---|---|
| 5,767,648 A * | 6/1998 | Morel | .................... | B25J 9/1628 |
| | | | | 318/568.1 |
| 7,403,826 B2 * | 7/2008 | Aghili | .................... | G05B 17/02 |
| | | | | 700/28 |

FOREIGN PATENT DOCUMENTS

| | | | | | |
|---|---|---|---|---|---|
| CN | 114800522 B | * | 7/2022 | ................ | B25J 9/16 |
| CN | 116460856 A | * | 7/2023 | ................ | B25J 9/16 |

* cited by examiner

*Primary Examiner* — David Luo

(57)     ABSTRACT

A servo control method for a multi-joint hydraulic manipulator based on adaptive sliding mode is provided. A motion trajectory of an end of the multi-joint hydraulic manipulator in a workspace is generated, and expected angular displacement, angular velocity and angular acceleration of individual joints are calculated. An actual angular displacement and an actual angular velocity of the individual joints under a current position-pose are calculated. Combined with a dynamic model of the manipulator, a driving force of individual joints is calculated. Based on the expected angular displacement, the actual angular displacement and the driving force, a sliding-mode surface is constructed. The adaptive law is updated to perform adaptive sliding-mode control for the manipulator. A system for implementing the servo control method is also provided.

9 Claims, 4 Drawing Sheets

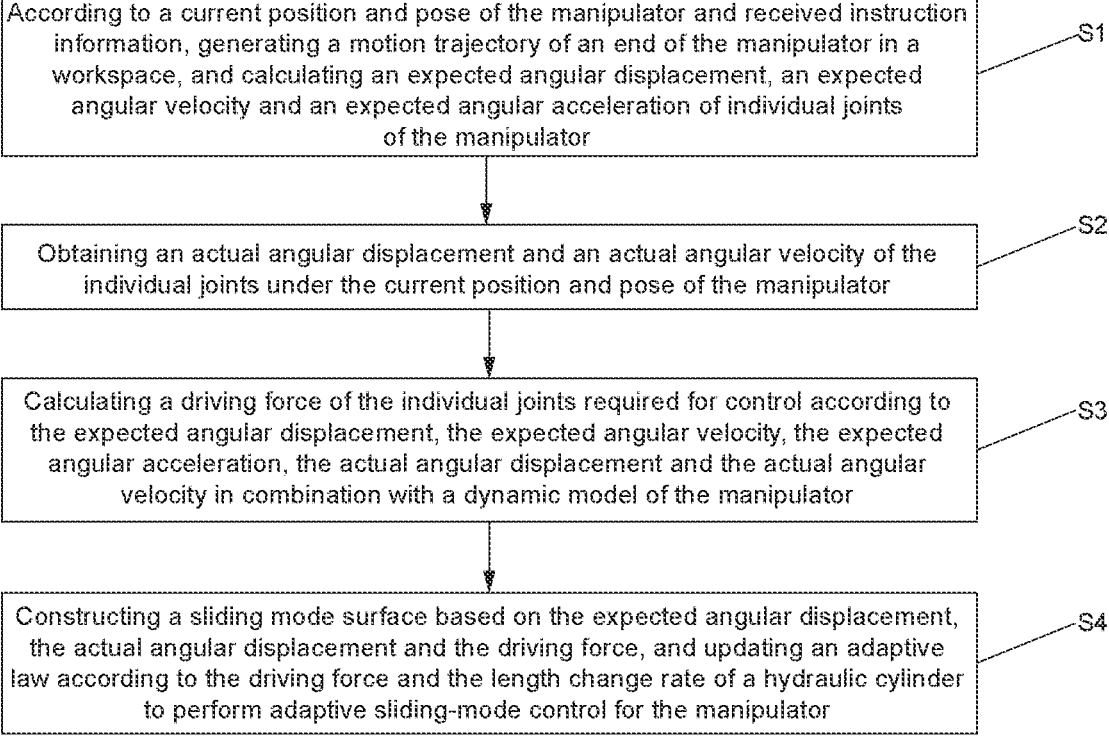

According to a current position and pose of the manipulator and received instruction information, generating a motion trajectory of an end of the manipulator in a workspace, and calculating an expected angular displacement, an expected angular velocity and an expected angular acceleration of individual joints of the manipulator — S1

Obtaining an actual angular displacement and an actual angular velocity of the individual joints under the current position and pose of the manipulator — S2

Calculating a driving force of the individual joints required for control according to the expected angular displacement, the expected angular velocity, the expected angular acceleration, the actual angular displacement and the actual angular velocity in combination with a dynamic model of the manipulator — S3

Constructing a sliding mode surface based on the expected angular displacement, the actual angular displacement and the driving force, and updating an adaptive law according to the driving force and the length change rate of a hydraulic cylinder to perform adaptive sliding-mode control for the manipulator — S4

Fig. 1

SERVO CONTROL METHOD AND SYSTEM FOR MULTI-JOINT HYDRAULIC MANIPULATOR BASED ON ADAPTIVE SLIDING MODE

CROSS-REFERENCE TO RELATED APPLICATIONS

This application claims the benefit of priority from Chinese Patent Application No. 202311166832.6, filed on Sep. 11, 2023. The content of the aforementioned application, including any intervening amendments thereto, is incorporated herein by reference in its entirety.

TECHNICAL FIELD

This application relates to servo control technologies for hydraulic equipment, and more particularly to a servo control method and system for a multi-joint hydraulic manipulator based on adaptive sliding mode.

BACKGROUND

This part only provides technical background related to the present disclosure rather than necessarily constituting the prior art.

With the rapid development of electronic technology, computer technology, automatic control technology and precision machining technology, the research, development and production technologies of motor-driven industrial robots have been increasingly improved in terms of servo motor, multi-axis controller, decelerator, sensor and system integration, and the large-scale production and installation of motor-driven industrial robots can be achieved. The motor-driven industrial robots have been widely used in various industrial production procedures, such as automatic welding, transportation, feeding and unloading, assembly, grinding and spraying. The installed capacity of industrial robots has become an important indicator to evaluate the national industrial automation level.

Due to high technology maturity, high motion precision and low cost, the motor-driven industrial robots have been extensively applied in industrial production, however, due to its small power-to-weight ratio and the difficulty in providing high-level protection such as waterproofing, explosion-proofing, dustproofing, and anti-electromagnetic interference for electrical components, it cannot be operated under harsh working environments, such as aerial operation for power grid, equipment maintenance and waste disposal under the nuclear radiation, underwater equipment installation and exploration and underground spraying and material grabbing of a coal mine. By comparison, the hydraulic manipulator has higher power density and stronger protection performance, and can be designed to have waterproof, anti-radiation and/or explosion-proof performance according to the operation environment. Therefore, it can replace or assist the artificial operation in harsh working environments, exhibiting important research value and broad application prospects.

There is no report about the mass production of multi-joint hydraulic manipulator products in China so far, and it is still in the research and development stage of hydraulic manipulator prototypes for special application scenarios. Individual joints of the manipulator all adopts an independent proportional-integral-differential (PID) servo control strategy, and the manipulator mainly adopts a master-slave teleoperation or kinematics-based motion control method at the operation level, However, these control strategies not only struggle with poor control accuracy, but also are prone to producing shock or crawling. Moreover, there is a lack of multi-axis hydraulic servo controller product compatible with the multi-joint hydraulic manipulator. Therefore, the existing multi-joint hydraulic manipulator control has seriously restricted the development of automation and unmanned operation in harsh environment, such as underwater, nuclear radiation, flammable and explosive condition.

SUMMARY

In order to overcome the shortcomings of the prior art, the present disclosure provides a servo control method and system for multi-joint hydraulic manipulator based on adaptive sliding mode, in which characteristic variables (driving force and length change rate of a hydraulic cylinder) after linearization of an actual servo output model of a hydraulic drive system are involved, and the two characteristic variables are respectively subject to self-adaptive control. Moreover, by virtue of excellent robustness of the sliding mode control, the influence caused by nonlinear factors, such as hysteresis, leak and zero-drift of servo valve and friction force of the hydraulic cylinder, so as to realize the coordinated control of complex multi-axis motion.

Technical solutions of the present disclosure are described as follows.

In a first aspect, this application provides a servo control method for a multi-joint hydraulic manipulator based on adaptive sliding mode, comprising:

according to a current position and pose of the multi-joint hydraulic manipulator and received instruction information, generating a motion trajectory of an end of the multi-joint hydraulic manipulator in a work space, and calculating an expected angular displacement, an expected angular velocity and an expected angular acceleration of individual joints of the multi-joint hydraulic manipulator;

obtaining an actual angular displacement of the individual joints and calculating an actual angular velocity of the individual joints under the current position and pose of the multi-joint hydraulic manipulator;

calculating a driving force of the individual joints required for control, according to the expected angular displacement, the expected angular velocity, the expected angular acceleration, the actual angular displacement and the actual angular velocity of the multi-joint hydraulic manipulator in combination with a dynamic model of the multi-joint hydraulic manipulator; and constructing a sliding-mode surface based on the expected angular displacement, the actual angular displacement and the driving force of the individual joints; and updating an adaptive law according to the driving force of the individual joints and a length change rate of a hydraulic cylinder to perform adaptive sliding mode control for the multi-joint hydraulic manipulator.

In an embodiment, the motion trajectory of the end of the multi-joint hydraulic manipulator in the workspace is generated by utilizing a preset point-to-point, arc, electronic gear or polynomial trajectory planning program.

In an embodiment, the step of calculating an expected angular displacement, an expected angular velocity and an expected angular acceleration of individual joints of the multi-joint hydraulic manipulator is performed through steps of:

according to an inverse kinematics model of the multi-joint hydraulic manipulator, mapping the motion trajectory of the end of the multi-joint hydraulic manipulator in the workspace to an angular displacement curve of the individual joints of the multi-joint hydraulic manipulator in a joint space; and smoothing the angular displacement curve through a quintic polynomial interpolation-based trajectory planning method to calculate the expected angular displacement, the expected angular velocity and the expected angular acceleration of the individual joints.

In an embodiment, the actual angular velocity of the individual joints under the current position and pose of the multi-joint hydraulic manipulator is calculated through a third-order integral chain differentiator.

In an embodiment, the step of calculating a driving force of the individual joints required for control is performed through steps of:

obtaining a joint torque according to the expected angular acceleration and the current position and pose of the multi-joint hydraulic manipulator; and based on a mapping relationship between an output force of the linear hydraulic cylinder and the joint torque, calculating the driving force of the individual joints, comprising an output force of a linear hydraulic cylinder and an output torque of a swing hydraulic cylinder.

In an embodiment, the sliding-mode surface is expressed as:

$$s = e = q_d - q$$

where s represents the sliding-mode surface; $q_d$ represents the expected angular displacement; q represents the actual angular displacement; and $e = q_d - q$ represents an angular displacement error.

In an embodiment, the adaptive law is expressed as:

$$\begin{bmatrix} \dot{\hat{a}} \\ \dot{\hat{b}} \end{bmatrix} = -\gamma \begin{bmatrix} \dot{x} \\ f_c \end{bmatrix} s;$$

where $\dot{x}$ represents a displacement change rate of the hydraulic cylinder; $f_c$ represents the driving force required for control; $\hat{a}$ represents an estimated value of a system parameter a which is continuously updated using the adaptive law; $\hat{b}$ represents an estimated value of a system parameter b which is continuously updated with the adaptive law; and $\gamma$ represents an adaptive control parameter matrix.

In an embodiment, a servo control signal is a servo control voltage signal; and the motion of the multi-joint hydraulic manipulator is controlled through steps of: converted the servo control voltage signal into an electric current signal, and sending the electric current signal to a servo valve to control motion of the multi-joint hydraulic manipulator;

the servo control voltage signal is expressed as:

$$u = \hat{a}\dot{x}_d + \hat{b}f_c + ks + \eta\text{sign}(s);$$

where u represents the servo control voltage signal; $\dot{x}_d$ represents an expected linear displacement change rate obtained based on an expected trajectory; k represents an exponential-convergence control parameter; and $\eta$ represents a constant-convergence control parameter.

In a second aspect, this application provides a servo control system for a multi-joint hydraulic manipulator based on adaptive sliding mode, comprising:

a first calculation module;

a second calculation module;

a third calculation module; and an adaptive control module;

wherein the first calculation module is configured for generating the motion trajectory of the end of the multi-joint hydraulic manipulator in the workspace according to the current position and pose of the multi-joint hydraulic manipulator and the received instruction information, and calculating the expected angular displacement, the expected angular velocity and the expected angular acceleration of the individual joints of the multi-joint hydraulic manipulator;

the second calculation module is configured for obtaining the actual angular displacement of the individual joints and calculating the actual angular velocity of the individual joints under the current position and pose of the multi-joint hydraulic manipulator;

the third calculation module is configured for calculating the driving force of the individual joints according to the expected angular displacement, the expected angular velocity, the expected angular acceleration, the actual angular displacement and the actual angular velocity in combination with the dynamic model of the multi-joint hydraulic manipulator; and the adaptive control module is configured for constructing the sliding-mode surface based on the expected angular displacement, the actual angular displacement and the driving force of the individual joints, and updating the adaptive law according to the driving force and a length change rate of the hydraulic cylinder to perform adaptive sliding mode control for the multi-joint hydraulic manipulator.

In a third aspect, this application provides a servo control device for a multi-joint hydraulic manipulator based on adaptive sliding mode, comprising:

a core controller;

an encoder signal acquisition module;

an analog output module; and a voltage-current conversion module;

wherein the core controller is configured for receiving an instruction from a user or an upper computer, running the servo control method in the first aspect, and outputting the servo control signal;

the encoder signal acquisition module is configured for performing kinematics calculation for a collected joint angle of the individual joints of the individual joints to obtain the current position and pose of the multi-joint hydraulic manipulator and sending the current position and pose to the core controller;

the analog output module is connected to the core controller, and is configured for performing digital-to-analog conversion (DAC) on the servo control signal to output a voltage signal which is continuous and controllable; and the voltage-current conversion module is configured for converting the voltage signal output by the analog output module into a current control signal of an electro-hydraulic servo valve; and the electro-hydraulic servo valve is configured for controlling a hydraulic oil flow of the hydraulic cylinder based on the current control signal, so as to control a motion of the individual joints.

The above technical solutions have the following beneficial effects.

When performing adaptive slicing mode control, characteristic variables (the driving force and the length change rate of the hydraulic cylinder) after the linearization of the actual servo output model of the hydraulic drive system are considered, and the two characteristic variables are respectively subject to self-adaptive control. Moreover, by virtue of excellent robustness of the sliding mode control, the influence caused by nonlinear factors, such as hysteresis, leak and zero-drift of servo valve and friction force of hydraulic cylinder, that is, a precise position control of a multi-axis hydraulic executive mechanism, so as to realize the coordinated control of complex multi-axis motion.

The present disclosure inputs diversified instructions, such as accessing the upper computer, a multi-axis series/parallel main hand, a multi-axis rocker rod, and a touch screen through various communication methods, to the device, which provides a friendly interaction mode for an operator, and reduces a feeling of fatigue caused by long-term single operation of the operator.

The present disclosure is internally provided with a typical kinematics model of multi-axis series multi-joint hydraulic manipulator, which can automatically complete a mapping from an operation space to the joint space and a difficulty of motion planning of multi-axis hydraulic manipulator.

The present disclosure is internally provided with a point-to-point, arc, electronic gear and polynomial trajectory motion planning and control function, which can directly generate a motion planning program through instruction input.

Advantages of additional aspects are partly described below. Part of the advantages will become obvious from the description below or become understood through embodiments of the present disclosure.

BRIEF DESCRIPTION OF THE DRAWINGS

The accompanying drawings are provided to promote the understanding of the present disclosure. The embodiments of the present disclosure are only illustrative rather than limiting this application.

FIG. 1 is a flow chart of a servo control method according to Embodiment 1 of the present disclosure.

DETAILED DESCRIPTION OF EMBODIMENTS

It should be understood that the embodiments described herein are only illustrative to provide a further understanding of the present disclosure. Unless otherwise defined, all technical and scientific terms used herein have the same meaning as commonly understood by those skilled in the art.

It should be noted that terms used herein only to illustrate the embodiments rather than limiting the implementation of this application. Unless otherwise defined, the singular form can be intended to include the plural form. In addition, it should be understood that the term "include" and/or "contain" used herein indicates the presence of feature, step, process, device, component and/or a combination thereof.

Embodiment 1

Referring to FIG. 1, a servo control method for a multi-joint hydraulic manipulator based on adaptive sliding mode is performed through the following steps.

(S1) According to a current position and pose of the multi-joint hydraulic manipulator and received instruction information, a motion trajectory of an end of the multi-joint hydraulic manipulator in a workspace is generated, and an expected angular displacement, an expected angular velocity and an expected angular acceleration of individual joints of the multi-joint hydraulic manipulator are calculated.

(S2) An actual angular displacement of the individual joints is obtained, and an actual angular velocity of the individual joints under the current position and pose is calculated.

(S3) A driving force of the individual joints required for control is calculated, according to the expected angular displacement, the expected angular velocity, the expected angular acceleration, the actual angular displacement and the actual angular velocity of the multi-joint hydraulic manipulator in combination with a dynamic model of the multi-joint hydraulic manipulator.

(S4) A sliding-mode surface is constructed based on the expected angular displacement, the actual angular displacement and the driving force of the individual joints. An adaptive law is updated according to the driving force of the individual joints and a length change rate of a hydraulic cylinder to perform adaptive sliding mode control for the multi-joint hydraulic manipulator.

A realizing process of the servo control method for a multi-joint hydraulic manipulator based on adaptive sliding mode according to this embodiment is detailedly described as follows.

Multi-joint hydraulic manipulators most have a serial topological structure, which can be in different forms, such as four-axis, five-axis and six-axis. This embodiment can be applied to the control of various multi-joint hydraulic manipulators through setting topological structures and parameters of the multi-joint hydraulic manipulator.

Figure 2:
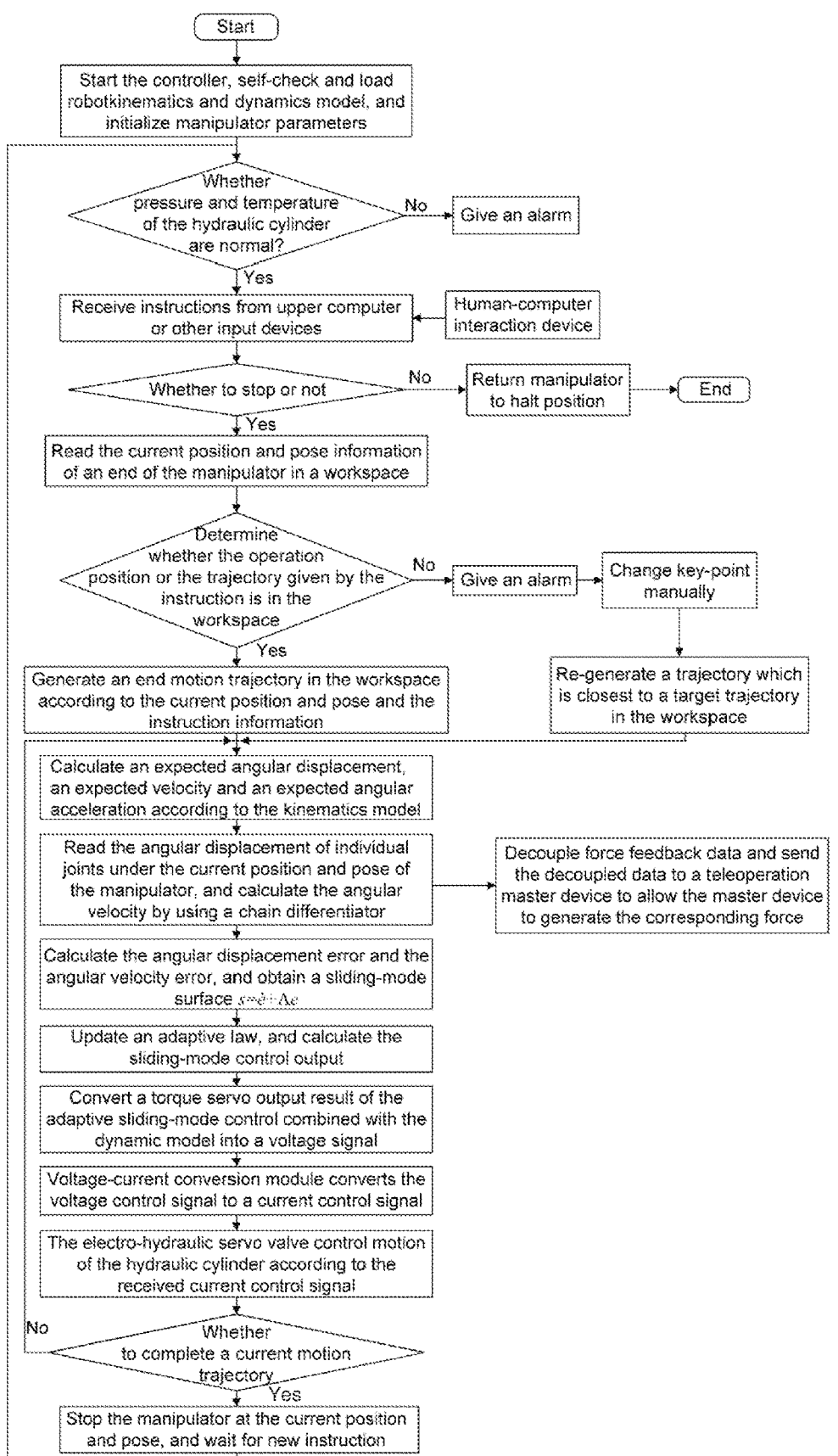
FIG. 2 is a flow chart of a control algorithm according to Embodiment 1 of the present disclosure.

Combined with a flow chart of a control algorithm shown in FIG. 2, the servo control method for a multi-joint hydraulic manipulator is described in detail as follows.

A servo controller of the multi-joint hydraulic manipulator is started. A self-check program is automatically executed. An external connected device is identified. A kinematics model of the multi-joint hydraulic manipulator provided in the servo controller is loaded. And parameters of kinematics of the multi-joint hydraulic manipulator and parameters of dynamics of the multi-joint hydraulic manipulator are initialized.

After passing the self-check, an external hydraulic station is started to provide a high-pressure hydraulic oil for the multi-joint hydraulic manipulator. Pressure and temperature of the hydraulic oil in an oil circuit of the multi-joint hydraulic manipulator are detected by the servo controller to determine whether they are within a normal working range, so as to prevent the hydraulic seal, pipeline and executive mechanism from being damaged by excessive oil pressure and temperature, and prevent the working performance of the multi-joint hydraulic manipulator from being affected by low pressure. If the pressure and temperature of the hydraulic oil are abnormal, the servo controller sends an alarm message, otherwise it enters a standby mode for receiving operation instructions.

When the servo controller receives an instruction sent by an external upper computer, a teleoperation main hand, a multi-axis rocker rod or a touch screen, it first determines whether it is a stop instruction. If yes, the multi-joint hydraulic manipulator is returned to a long-term halt position, and a control program is stopped. If not, an information of the current position and pose of the end of the multi-joint hydraulic manipulator in the workspace is read through an encoder signal acquisition module.

The servo controller automatically determines whether an operating position or trajectory given by the instruction is totally in the workspace of the multi-joint hydraulic manipulator. If yes, according to the current position and pose and the received instruction information of the multi-joint hydraulic manipulator, the motion trajectory of the end of the multi-joint hydraulic manipulator is generated through utilizing a preset point-to-point, arc, electronic gear or polynomial trajectory planning program in the servo controller. If not, the servo controller sends the alarm message, and the operator can specify several key points in an original instruction through a human-computer interaction (HCI) device, so that the servo controller re-generates a trajectory which is closest to a target trajectory in the workspace.

After completing planning of the motion trajectory of the end of the multi-joint hydraulic manipulator, the servo controller first maps the trajectory of the end of the multi-joint hydraulic manipulator in the workspace to an angular displacement curve of the individual joints of the multi-joint hydraulic manipulator in a joint space according to the kinematics model. And the servo controller selects several waypoints in the angular displacement curve and subjects the waypoints and time to correspondence.

In order to ensure the operation stability of the multi-joint hydraulic manipulator, a trajectory of an expected angular velocity and an expected angular acceleration of the individual joints should be smooth and uninterrupted. And in order to eliminate an impact caused by a sudden change of a control signal when the multi-joint hydraulic manipulator starts and stops, the angular velocity and the angular acceleration is needed to be restricted at an initial and stopping time.

Therefore, a quintic polynomial interpolation-based trajectory planning method is applied on the trajectory in the joint space for smoothing process. A quintic polynomial is expressed as:

$$\begin{cases} \theta(t) = a_0 + a_1 t + a_2 t^2 + a_3 t^3 + a_4 t^4 + a_5 t^5 \\ \dot\theta(t) = a_1 + 2a_2 t + 3a_3 t^2 + 4a_4 t^3 + 5a_5 t^4 \quad ; \\ \ddot\theta(t) = 2a_2 + 6a_3 t + 12a_4 t^2 + 20a_5 t^3 \end{cases}$$

where $\theta(t)$, $\dot\theta(t)$, and $\ddot\theta(t)$ respectively represent a displacement variable, a velocity variable and an acceleration variable after interpolation; t represents a time variable, and $a_0, a_1, \ldots, a_5$ represent undetermined coefficients.

After adding a constraint to the angular velocity and angular acceleration at a start point and an end point, solutions of quintic polynomial interpolation at an initial time $t_0=0$ and a cut-off time $t_f$ are expressed as:

$$\begin{cases} a_0 = \theta_0 \\ a_1 = \dot\theta_0 \\ a_2 = \dfrac{\ddot\theta_0}{2} \\ a_3 = \dfrac{20\theta_f - 20\theta_0 - (8\dot\theta_f + 12\dot\theta_0)c_f - (3\ddot\theta_0 - \ddot\theta_f)c_f^2}{2f_f^3} \\ a_4 = \dfrac{30\theta_0 - 30\theta_f + (14\dot\theta_f + 16\dot\theta_0)c_f + (3\ddot\theta_0 - 2\ddot\theta_f)c_f^2}{2f_f^4} \\ a_5 = \dfrac{12\theta_f - 12\theta_0 - (6\dot\theta_f + 6\dot\theta_0)c_f - (\ddot\theta_0 - \ddot\theta_f)c_f^2}{2f_f^5} \end{cases}$$

where $\theta_0$, $\dot\theta_0$, and $\ddot\theta_0$ respectively represent an expected joint displacement, an expected joint velocity and an expected joint acceleration at the initial time; $t_f$ represents the cut-off time; and $\theta_f$, $\dot\theta_f$, and $\ddot\theta_f$ respectively represent the expected joint displacement, the expected joint velocity and the expected joint acceleration at the cut-off time.

Motion trajectories of all intermediate start and end points are combined to obtain an expected trajectory of the individual joints of the multi-joint hydraulic manipulator.

An expected driving force and an expected joint torque of the individual joints are calculated according to a reverse dynamic model, the current position and pose and the expected trajectory. An actual driving force and an actual joint torque can be calculated indirectly through reading pressures in two cavities of a hydraulic cylinder according to an analog input module. Or data of multidimensional force sensor of the end of the multi-joint hydraulic manipulator is read through the analog input module, so as to further calculate an end load through the dynamic model of multi-joint hydraulic manipulator and feed back to the teleoperation main hand for providing a certain proportion of force feedback to the operator, which reduces a feeling of fatigue caused by long-term operation of the operator.

Figure 3:
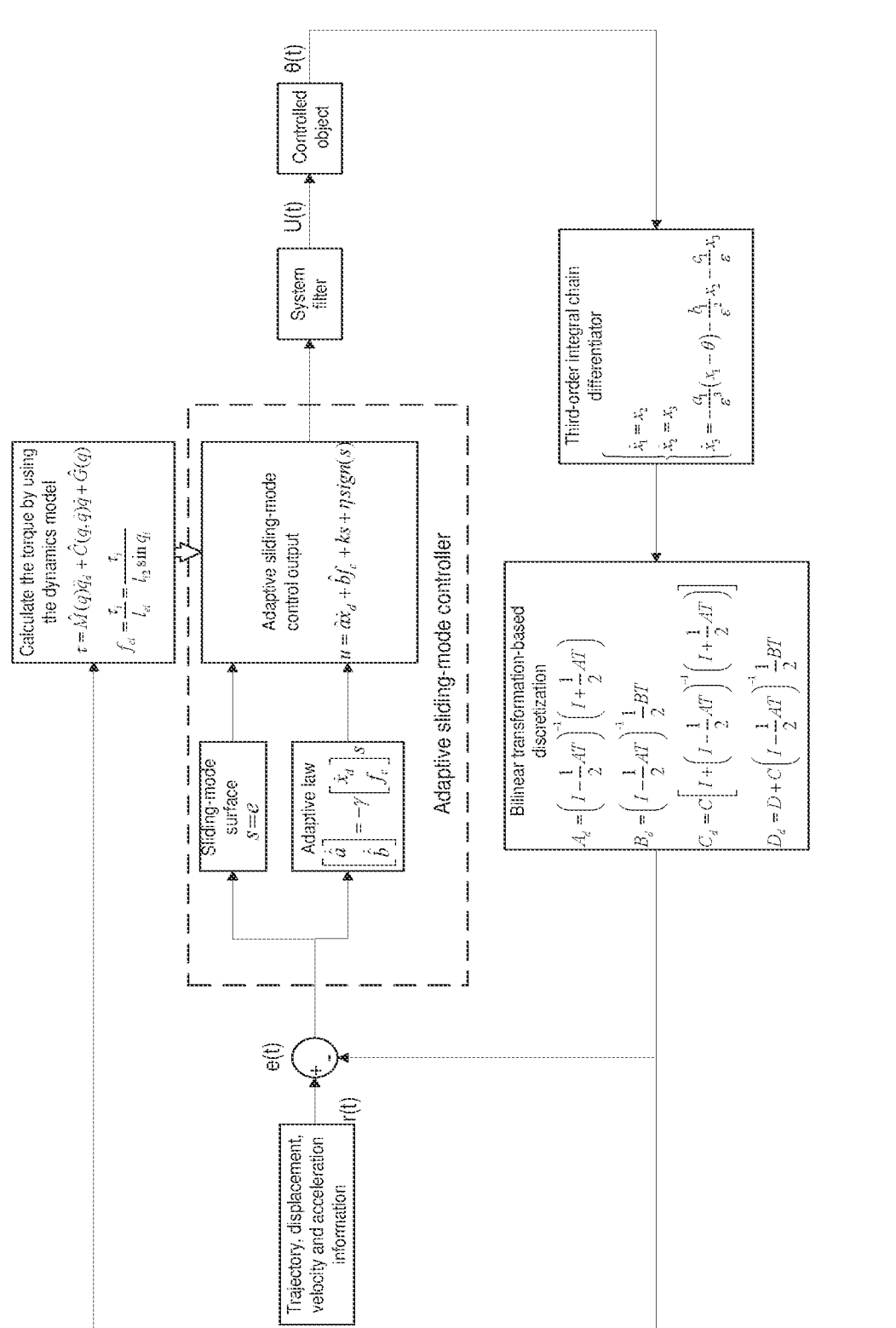
FIG. 3 is a schematic diagram of servo algorithm for a multi-joint hydraulic manipulator according to Embodiment 1 of the present disclosure.

Referring to FIG. 3, after obtaining the expected angular displacement and a feedback angular displacement of the individual joints, a feedback angular velocity and a feedback angular acceleration of the individual joints are calculated through a third-order integral chain differentiator. And a continuous time state space equation of the third-order integral chain differentiator is expressed as:

$$\begin{cases} \dot x_1 = x_2 \\ \dot x_2 = x_3 \\ x_3 = -\dfrac{a_1}{\varepsilon^3}(x_1 - \theta) - \dfrac{b_1}{\varepsilon^2}x_2 - \dfrac{c_1}{\varepsilon}x_3 \end{cases} ;$$

where $a_1$, $b_1$, and $c_1$ are constants in a group; $\varepsilon$ represents a constant related to a system response characteristic; $\theta$ represents original data read by a control system from the sensor; in a case of $b_1 \times c_1 > a_1$, the system is asymptotically stable according to Hurwitz Stability Criteron, and the smaller & is, the faster the system responds; $x_1$, $x_2$ and $x_3$ represent state variables of the state space equation; when the system is in asymptotic stability, $x_1 \to \theta$, and values of the angular velocity and the angular acceleration of the individual joints can be obtained by approximation of $x_2$ and $x_3$.

The continuous-time chain differentiation cannot be realized by a real-time control system, but the continuous time state space equation can be discretized through a bilinear transformation method, which can be expressed as:

$$A_d = \left(I - \frac{1}{2}AT\right)^{-1}\left(I + \frac{1}{2}AT\right)$$

$$B_d = \left(I - \frac{1}{2}AT\right)^{-1}\frac{1}{2}BT$$

$$C_d = C\left[I + \left(I - \frac{1}{2}AT\right)^{-1}\left(I + \frac{1}{2}AT\right)\right]$$

$$D_d = D + C\left(I - \frac{1}{2}AT\right)^{-1}\frac{1}{2}BT;$$

where T represents a time constant in seconds; I represents an identity matrix; A, B, C and D respectively represent a system matrix, a control matrix, an output matrix and a direct transfer matrix of the continuous time state space equation; $A_d$, $B_d$, $C_d$ and $D_d$ respectively represent the system matrix, the control matrix, the output matrix and the direct transfer matrix after discretization.

Owing to lack of accurate module parameters of the servo valve and hydraulic cylinder, it is needed to obtain roughly estimated values of the model parameters through experiments in a process. The roughly estimated values of the model parameters can be determined by observing a motion of an open-loop system. When the hydraulic cylinder extends and retracts, the control signal is directly sent, the motion of the hydraulic cylinder in different directions is observed, and a force value of the individual joints and the length change rate of hydraulic cylinder are recorded. And according to a linear relationship between a control current $i_v$ of the servo valve, a cylinder velocity $\dot{x}_p$ and a cylinder output force $f_c$, a rough range of the module parameters is determined through the least-square method.

After the rough range of the module parameters of the servo valve is obtained, the servo control is performed through a control algorithm of an adaptive sliding mode in combination with computed torque. A designed sliding-mode surface is expressed as:

$$s = e = q_d - q;$$

where $q_d$ represents the expected angular displacement of the individual joints; q represents the actual angular displacement of the individual joints; and e=$q_d$−q represents a tracking error of position, that is, an angular displacement error of the individual joints.

A linearized model of the hydraulic cylinder is simplified as:

$$a\dot{x} + bf_c = u(t) + \Delta;$$

where $\Delta$ represents a modeling error; for a linear cylinder, $\dot{x}$ represents a linear displacement change rate, and $f_c$ represents the output force; for a swing cylinder, $\dot{x}$ represents an angular displacement change rate, $f_c$ represents the joint torque, and a and b represent the module parameters after linearization; â represents an estimated value of a, and $\hat{b}$ represents an estimated value of b; and the adaptive law is expressed as:

$$\begin{bmatrix}\dot{\hat{a}}\\\dot{\hat{b}}\end{bmatrix} = -\gamma\begin{bmatrix}\dot{x}\\f_c\end{bmatrix}s;$$

where $\dot{x}$ represents a displacement change rate of the hydraulic cylinder; $f_c$ represent the driving force required for control; â represents an estimated value of a system parameter a which is continuously updated using the adaptive law; $\hat{b}$ represents an estimated value of a system parameter b which is continuously updated using the adaptive law; and $\gamma$ represents an adaptive control parameter matrix, which can continuously adjust the control system according to the adaptive law during the control process.

In order to make the designed sliding-mode surface s→0, the control algorithm of adaptive sliding mode adopts an index convergence rate $\dot{s}$=−$\eta$signs−ks, where k represents an exponential-convergence control parameter, and $\eta$ represents a constant-convergence control parameter. And a control law of the adaptive sliding mode is expressed as:

$$u = \hat{a}\dot{x}_d + \hat{b}f_c + ks + \eta\,\text{sign}(s);$$

where u represents the servo control voltage signal; â represents the estimated value of the system parameter a which is continuously updated using the adaptive law; $\dot{x}_d$ represents the expected linear displacement change rate obtained based on the expected trajectory; $\hat{b}$ represents the estimated value of the system parameter b which is continuously updated using the adaptive law; $f_c$ represents the driving force of the individual joints required for control; k represents the exponential-convergence control parameter; $\eta$ represents the constant-convergence control parameter; and s represents the sliding-mode surface.

In the above exponential approach, $\dot{s}$=−ks ensures an approach speed gradually decreases from a large value to zero, which not only shortens an approach time, but also makes a speed very small when a moving point reaches the sliding-mode surface. However, for a simple exponential approach, the moving point approaching a switching surface is a gradual process, which cannot be guarantee to arrive in a finite time, there is no sliding mode on the switching surface. Therefore, a constant-convergence term $\dot{s}$=−$\eta$signs is needed to be added, so that when s is approaching zero, the approach speed is $\eta$ rather than 0, which can guarantee to arrive in a finite time.

In a servo process of the hydraulic manipulator, in order to ensure fast approach and weaken buffeting, $\eta$ should be decreased while k increased.

In order to eliminate a coupling between components of the multi-joint hydraulic manipulator, it is needed to control in combination with a computed torque method. In a case of known dynamics model of multi-joint hydraulic manipulator M(q)$\ddot{q}$+C(q, $\dot{q}$)$\dot{q}$+G(q)=$\tau$−d, a value of $f_c$ is given. For the swing cylinder, $f_c$ is the joint torque $\tau$. For the linear cylinder, it is needed to consider a mapping relationship between the output force of the hydraulic cylinder and the joint torque. A magnitude of the joint torque is equal to a multiplication of the output force and an effective length. An output force of a hydraulic driver is set as $f_{ci}$, the effective length is denoted as $l_{ei}$, and the joint torque $\tau_i$ is expressed as:

$$\tau_i = f_{ci}l_{ei} = f_{ci}l_{i2}\sin(q_i); \text{ and}$$

$$q_i = \arccos\left(\frac{l_{i2}^2 + l_{ki}^2 - l_{i1}^2}{2l_{i2}l_{ki}}\right);$$

where $l_{i1}$ and $l_{i2}$ represent structural constants of the multi-joint hydraulic manipulator; $l_{ki}$ represents a variable related to the angular displacement of the individual joints q; subscripts i=2, 3, 5, are respectively in correspondence to three rotating joints using the linear cylinder.

The expected angular acceleration and the current position and pose of the multi-joint hydraulic manipulator are calculated according to the trajectory, and the joint torque $\tau = \hat{M}(q)\ddot{q}_d + \hat{C}(q, \dot{q})\dot{q} + \hat{G}(q)$ is obtained. Combined with the mapping relationship between the output force of the hydraulic cylinder and the joint torque, an output force of the linear hydraulic cylinder and an output torque of the swing hydraulic cylinder are respectively calculated. $\ddot{q}_d$ represents an angular acceleration vector of the individual joints of a given trajectory; q and $\dot{q}$ respectively represent the angular displacement and an angular velocity vector of the multi-joint hydraulic manipulator under the current position and pose; $\hat{M}(q)$ represents a mass matrix of the multi-joint hydraulic manipulator; $\hat{C}(q, \dot{q})$ represents a vector of a centrifugal force and a Coriolis force; and $\hat{G}(q)$ represents a gravity vector.

When completing a current motion trajectory, the multi-joint hydraulic manipulator stops in the current position and pose, and waits for a new instruction, until it receives a new motion instruction or a stop instruction.

Embodiment 2

This embodiment provides a servo control system for a multi-joint hydraulic manipulator based on adaptive sliding mode, including:

a first calculation module;

a second calculation module;

a third calculation module; and an adaptive control module.

The first calculation module is configured for generating the motion trajectory of the end of the multi-joint hydraulic manipulator in the workspace according to the current position and pose of the multi-joint hydraulic manipulator and the received instruction information, and solving the expected angular displacement, the expected angular velocity and the expected angular acceleration of the individual joints of the multi-joint hydraulic manipulator.

The second calculation module is configured for obtaining the actual angular displacement of the individual joints and calculating the actual angular velocity of the individual joints under the current position and pose of the multi-joint hydraulic manipulator.

The third calculation module is configured for calculating the driving force of the individual joints required for control according to the expected angular displacement, the expected angular velocity and the expected angular acceleration in combination with the dynamic model of the multi-joint hydraulic manipulator.

The adaptive control module is configured for constructing the sliding-mode surface based on the expected angular displacement, the actual angular displacement and the driving force of the individual joints, and updating the adaptive law according to the driving force and the length change rate of the hydraulic cylinder to perform adaptive sliding mode control for the multi-joint hydraulic manipulator.

Embodiment 3

Figure 4:
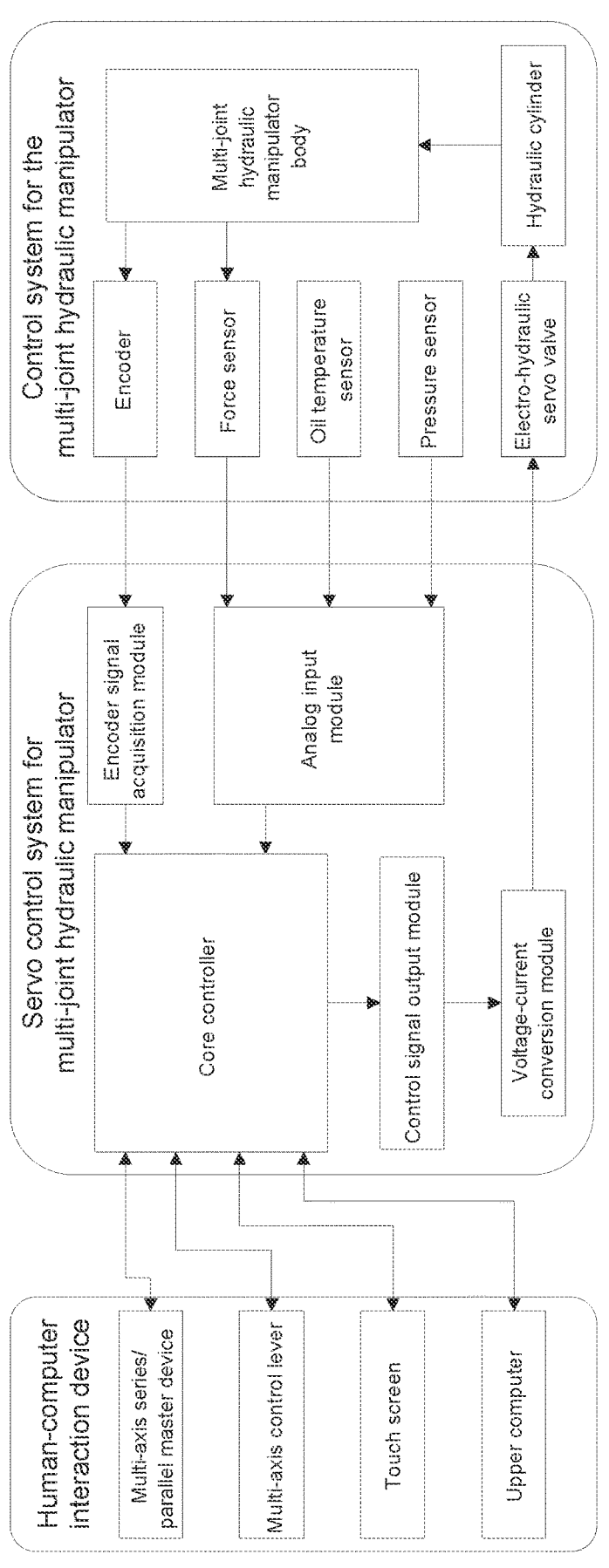
FIG. 4 structurally depicts a device according to Embodiment 3 of the present disclosure.

Referring to FIG. 4, this embodiment provides a servo control device for a multi-joint hydraulic manipulator based on adaptive sliding mode, including:

a core controller;

an encoder signal acquisition module;

an analog input module;

an analog output module;

a voltage-current conversion module; and a human-computer interaction (HCI) device.

The core controller is configured for receiving an instruction from a user or an upper computer, running the servo control method of embodiment 1, and outputting the servo control signal according to feedback information. In order to facilitate operation of the user, the core controller is internally provided with an encapsulation instruction program of point-to-point, arc, electronic gear and polynomial trajectory and an electronic gear instruction program of multi-joint precise coupled motion. The motion control program can be quickly generated after the user inputs the instructions and parameters.

The encoder signal acquisition module is configured for converting signals from an encoder, and converting a RS422 communication protocol signal from the encoder to a Transistor-Transistor Logic (TTL) signal which is readable to the core controller. The encoder is configured for obtaining the angular angle of the individual joints. The encoder signal acquisition module is configured for performing kinematics calculation to obtain the current position and pose of the multi-joint hydraulic manipulator, and sending the current position and pose to the core controller.

The analog input module is configured for obtaining analog signals from a force sensor, an oil-temperature sensor and a pressure sensor on the multi-joint hydraulic manipulator, and sending the analog signals to the core controller through an internal analog-digital conversion module.

The analog output module is connected to the core controller. And the analog output module is configured for performing an analog-digital conversion on a calculation result from the servo control method to output a constant voltage signal which is controllable.

The voltage-current conversion module is configured for converting the voltage signal output by the analog output module into a current control signal of an electro-hydraulic servo valve. And the electro-hydraulic servo valve is configured for controlling a hydraulic oil flow of the hydraulic cylinder according to a received current signal, so as to control a motion of the individual joints of the multi-joint hydraulic manipulator.

The HCI device commonly used in the control system, including a multi-axis series/parallel main hand, a multi-axis rocker rod, a touch screen and an upper computer, can access the core controller through different hardware interfaces and data transfer protocol, so that the multi-joint hydraulic manipulator controls instruction input and a master-slave control, and can feed state information of the multi-joint hydraulic manipulator back to the operator through sensors.

The upper computer is connected to the core controller to realize data interaction thereof through an Ethernet bus. The core controller can be a high-performance NI board type industrial computer, a box-type industrial control computer or other high-performance embedded controller. The upper computer sends various motion instruction to the core controller through its UI interface, and receives data returned from the core controller. The upper computer also displays changes of various work states, such as pressure and temperature of the hydraulic system and displacement, end position and pose and load of the individual joints of the multi-joint hydraulic manipulator, and can control the multi-joint hydraulic manipulator intuitively.

Described above are only preferred embodiments of this application, and are not intended to limit the scope of this application. It should be noted that various modifications, equivalent replacements and developments made by those skilled in the art without departing from the spirit of this application shall fall within the scope of this application defined by the appended claims.

What is claimed is:

1. A servo control method for a multi-joint hydraulic manipulator based on adaptive sliding mode, comprising:

according to a current position and pose of the multi-joint hydraulic manipulator and received instruction information, generating a motion trajectory of an end of the multi-joint hydraulic manipulator in a workspace, and calculating an expected angular displacement, an expected angular velocity and an expected angular acceleration of individual joints of the multi-joint hydraulic manipulator;

obtaining an actual angular displacement of the individual joints and calculating an actual angular velocity of the individual joints under the current position and pose of the multi-joint hydraulic manipulator;

calculating a driving force of the individual joints required for control, according to the expected angular displacement, the expected angular velocity, the expected angular acceleration, the actual angular displacement and the actual angular velocity of the multi-joint hydraulic manipulator in combination with a dynamic model of the multi-joint hydraulic manipulator; and constructing a sliding-mode surface based on the expected angular displacement, the actual angular displacement and the driving force of the individual joints; and updating an adaptive law according to the driving force of the individual joints and a length change rate of a hydraulic cylinder to perform adaptive sliding mode control for the multi-joint hydraulic manipulator;

wherein the actual angular velocity of the individual joints under the current position and pose of the multi-joint hydraulic manipulator is calculated through a third-order integral chain differentiator.

2. The servo control method of claim 1, wherein the motion trajectory of the end of the multi-joint hydraulic manipulator in the workspace is generated by utilizing a preset point-to-point, arc, electronic gear or polynomial trajectory planning program.

3. The servo control method of claim 2, wherein the step of calculating an expected angular displacement, an expected angular velocity and an expected angular acceleration of the individual joints of the multi-joint hydraulic manipulator is performed through steps of:

according to an inverse kinematics model of the multi-joint hydraulic manipulator, mapping the motion trajectory of the end of the multi-joint hydraulic manipulator in the workspace to an angular displacement curve of the individual joints of the multi-joint hydraulic manipulator in a joint space; and smoothing the angular displacement curve through a quintic polynomial interpolation-based trajectory planning method to calculate the expected angular displacement, the expected angular velocity and the expected angular acceleration of the individual joints.

4. The servo control method of claim 1, wherein the step of calculating a driving force of the individual joints required for control is performed through steps of:

obtaining a joint torque according to the expected angular acceleration and the current position and pose of the multi-joint hydraulic manipulator; and based on a mapping relationship between an output force of the hydraulic cylinder and the joint torque, calculating the driving force of the individual joints, comprising an output force of a linear hydraulic cylinder and an output torque of a swing hydraulic cylinder.

5. The servo control method of claim 1, wherein the adaptive sliding mode control is performed through steps of:

calculating an angular displacement error of the individual joints based on the expected angular displacement and the actual angular displacement to obtain the sliding-mode surface; and updating the adaptive law of a model of the hydraulic cylinder according to the driving force of the individual joint required for control and the length change rate of the hydraulic cylinder to obtain a servo control signal, and controlling motion of the multi-joint hydraulic manipulator according to the servo control signal.

6. The servo control method of claim 5, wherein the servo control signal is a servo control voltage signal; and the motion of the multi-joint hydraulic manipulator is controlled through steps of: converting the servo control voltage signal into an electric current signal, and sending the electric current signal to a servo valve to control the motion of the multi-joint hydraulic manipulator;

the servo control voltage signal is expressed as:

$$u = \hat{a}\dot{x}_d + \hat{b}f_c + ks + \eta\,\mathrm{sign}(s);$$

wherein u represents the servo control voltage signal; $\hat{a}$ represents an estimated value of a system parameter a which is continuously updated using the adaptive law; $\dot{x}_d$ represents an expected linear displacement change rate obtained based on an expected trajectory; $\hat{b}$ represents an estimated value of a system parameter b which is continuously updated using the adaptive law; $f_c$ represents the driving force of the individual joints required for control; k represents an exponential-convergence control parameter; $\eta$ represents a constant-convergence control parameter; and s represents the sliding-mode surface.

7. The servo control method of claim 1, wherein the sliding-mode surface is expressed as:

$$s = e = q_d - q;$$

wherein s represents the sliding-mode surface; $q_d$ represents the expected angular displacement; q represents the actual angular displacement; and $e = q_d - q$ represents an angular displacement error; and the adaptive law is expressed as:

$$\begin{bmatrix} \dot{\hat{a}} \\ \dot{\hat{b}} \end{bmatrix} = -\gamma \begin{bmatrix} \dot{x} \\ f_c \end{bmatrix} s;$$

wherein $\dot{x}$ represents a displacement change rate of the hydraulic cylinder; $f_c$ represents the driving force required for control; $\hat{a}$ represents an estimated value of a system parameter a which is continuously updated using the adaptive law; $\hat{b}$ represents an estimated value of a system parameter b which is continuously updated using the adaptive law; and $\gamma$ represents an adaptive control parameter matrix.

8. A servo control device for a multi-joint hydraulic manipulator based on adaptive sliding mode, comprising:

a core controller;

an encoder signal acquisition module;

an analog output module; and a voltage-current conversion module;

wherein the core controller is configured for receiving an instruction from a user or an upper computer, running the servo control method of claim 1, and outputting a servo control signal;

the encoder signal acquisition module is configured for performing kinematics calculation for a collected joint angle of individual joints of the multi-joint hydraulic manipulator to obtain the current position and pose of the multi-joint hydraulic manipulator, and sending the current position and pose to the core controller;

the analog output module is connected to the core controller, and is configured for performing digital-to-analog conversion on the servo control signal to output a voltage signal which is continuous and controllable; and the voltage-current conversion module is configured for converting the voltage signal output by the analog output module into a current control signal of an electro-hydraulic servo valve; and the electro-hydraulic servo valve is configured for controlling a hydraulic oil flow of the hydraulic cylinder based on the current control signal, so as to control a motion of the individual joints of the multi-joint hydraulic manipulator.

9. A servo control system for a multi-joint hydraulic manipulator based on adaptive sliding mode, comprising:

a first calculation module;

a second calculation module;

a third calculation module; and an adaptive control module;

wherein the first calculation module is configured for generating a motion trajectory of an end of the multi-joint hydraulic manipulator in a workspace according to a current position and pose of the multi-joint hydraulic manipulator and a received instruction information, and calculating an expected angular displacement, an expected angular velocity and an expected angular acceleration of individual joints of the multi-joint hydraulic manipulator;

the second calculation module is configured for obtaining an actual angular displacement of the individual joints and calculating, through a third-order integral chain differentiator, an actual angular velocity of the individual joints under the current position and pose of the multi-joint hydraulic manipulator;

the third calculation module is configured for calculating a driving force of the individual joints required for control according to the expected angular displacement, the expected angular velocity, the expected angular acceleration, the actual angular displacement and the actual angular velocity in combination with a dynamic model of the multi-joint hydraulic manipulator; and the adaptive control module is configured for constructing a sliding-mode surface based on the expected angular displacement, the actual angular displacement and the driving force of the individual joints, and updating an adaptive law according to the driving force and a length change rate of a hydraulic cylinder to perform adaptive sliding mode control for the multi-joint hydraulic manipulator.

\* \* \* \* \*